Mar. 13, 1923.
E. FLEISCHER.
PROCESS AND FURNACE FOR REDUCING AND ROASTING ORES.
FILED AUG. 21, 1917.
1,448,340.
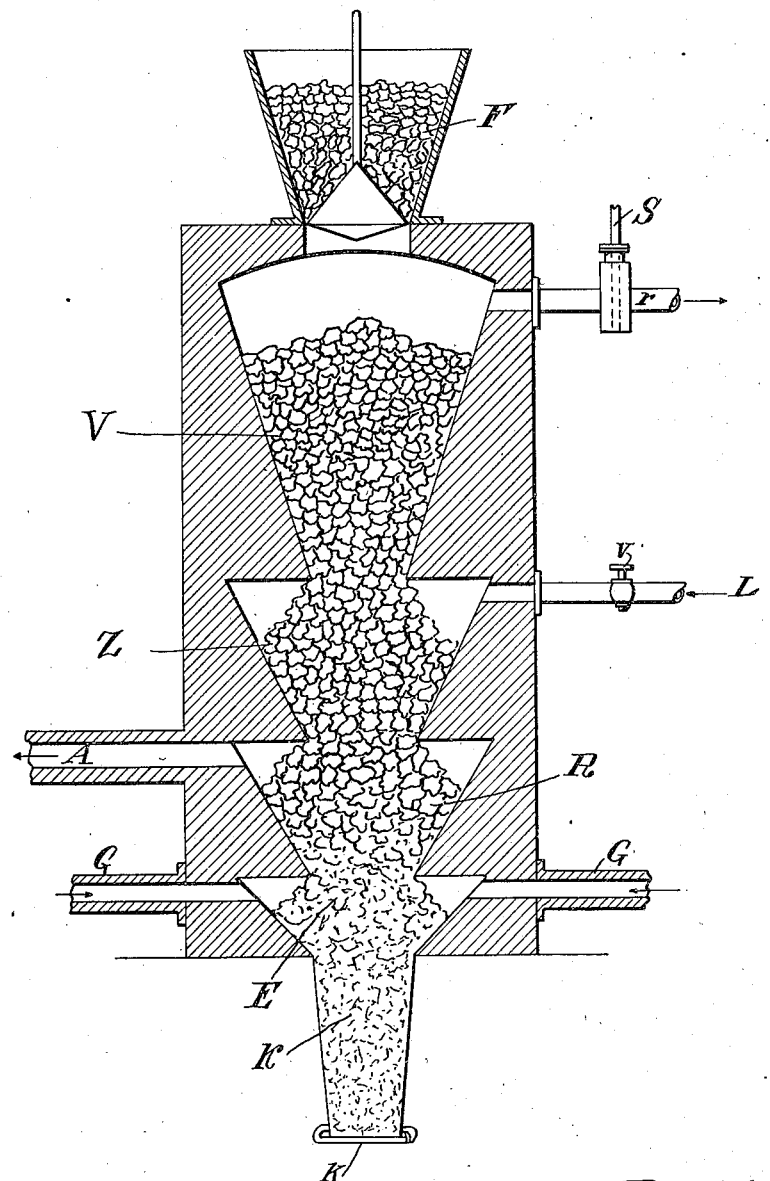

Patented Mar. 13, 1923.

1,448,340

UNITED STATES PATENT OFFICE.

EMIL FLEISCHER, OF DRESDEN, GERMANY, ASSIGNOR, BY MESNE ASSIGNMENTS, TO THE CHEMICAL FOUNDATION, INC., A CORPORATION OF DELAWARE.

PROCESS AND FURNACE FOR REDUCING AND ROASTING ORES.

Application filed August 21, 1917. Serial No. 187,398.

*To all whom it may concern:*

Be it known that I, Dr. EMIL FLEISCHER, chemist, a subject of the German Emperor, and resident of Dresden, Germany, have invented new and useful Processes and Furnaces for Reducing and Roasting Ores (for which I have filed an application in Germany, October 26, 1916), of which the following is a specification.

The process forming the subject matter of the present invention has as its object the reduction of ores by means of a very hot reducing gas. The heating or roasting of the ore shall be performed in the same apparatus, and the gas and air volumes employed therefor must be adjustable. Besides it is intended that the still very hot waste gases of the reduction process, which still contain a large amount of fuel, be utilized to a small degree only for heating and roasting, and to their greater part for another purpose and be conducted away for the same. With these objects in view the following process is employed.

Of the whole ore burden filled into the reducing and roasting furnace, which has the form of a shaft divided by constructions into several chambers, only the lower part serves for reduction purposes, whereas the upper part serves to heat-up or roast the ore. Between the said two sections, however, an intermediate zone must be interposed. The intermediate zone will be penetrated from below by a small, adjustable volume of the waste gases from the reduction process, the same waste gases being burnt by aid of air introduced thereto above the intermediate zone, so as to heat or roast the ore lying thereabove. The greater part of the waste gases from the reduction process, however, leaves the apparatus below the intermediate zone, in order to be utilized for other purposes.

In the accompanying drawing the apparatus for carrying out the present invention is shown in longitudinal section. This apparatus consists of a furnace of the shaft type, in which protruding walls divide the ore charge into a series of sections separated from each other by gas chambers.

In the said drawing V indicates the heating or roasting section, Z is the intermediate section and R is the reducing section of the ore charge. The hot gas for reducing the ore enters into the furnace at E. K is a cooling chamber, from which the reduced ore may be tapped from time to time through k. Above the furnace is disposed a hopper F provided with a closure.

For operating the furnace described a reducing gas is introduced through the gas nozzles G, G into the ore charge; the heat of this gas should not be lower than the reducing temperature of the respective ore. After the said gas has passed through the reducing section R, its main volume escapes through A as a hot combustible waste gas to be used for other purposes, for example for smelting purposes.

If, now, the gate S, through which the roasting gases escape in pipe r, is not closed, a part of the waste gases from the reduction will penetrate the intermediate section Z, without, however, being here fully oxidized. By air being blown in through the pipe L and the regulating valve v the gas is consumed and the fire gases will heat the ore in the heating and roasting section V. Besides the air regulating at v the volume of gas flowing through the intermediate section may also be controlled by the gate S, so that the temperature of the heating section V and degree to which the ore is oxidized may be regulated at will. In place of pure air, also a mixture of air and steam may be blown into the furnace at L.

I claim:

1. The herein described process for the treatment of ore which comprises passing a reducing gas through a large body of ore of inverted conical form, removing the major portion of the reducing gas at the upper end of said body of ore, drawing the remainder of the reducing gas through a second large body of ore, also of inverted conical form, firing the reducing gas at the upper portion of said second body of ore, and then drawing the fired gas through a third body of ore of conical form arranged above the second body of ore, substantially as described.

2. A furnace for simultaneously heating or roasting and reducing ores, composed of a heating or roasting chamber adapted to hold a large volume of ore in the gangue, a contraction in the furnace at the base of said heating chamber, an intermediate chamber below said contraction, a contraction at the base of said intermediate chamber, a reducing chamber below said intermediate chamber and second-named contraction, means for introducing a reducing gas at high temperature to the lower part of said reducing chamber, an outlet for the greater part of the reducing gas at the upper part of said reducing chamber, means for drawing a portion of the waste reducing gas up into and through the intermediate chamber, and an air supply in the upper part of said intermediate chamber for firing said reducing gas before the latter enters the heating chamber.

3. A furnace including a heating or roasting chamber of inverted conical shape having a capacity to receive a large quantity of ore in the gangue and adapted to hold the ore unmoved therein during the roasting process, a hopper for introducing ore in the gangue to said chamber, a device for closing the communication between said hopper and chamber, an outlet at the upper part of said chamber, a valve controlling said outlet, a second inverted conical chamber beneath and communicating with said first-named chamber also for holding unmoved a large volume of ore in the gangue, a controllable air inlet at the upper part of said second chamber, a third inverted conical chamber holding a large amount of ore in the gangue and communicating with the chamber second named, a reducing gas inlet through the lower part of said last-mentioned chamber, a reducing gas outlet in the upper part thereof, and an outlet at the bottom of the last-named chamber for the removal of the reduced ore, substantially as described In testimony, that I claim the foregoing as my invention, I have signed my name in presence of two witnesses, this 7th day of July, 1917.

Dr. EMIL FLEISCHER.

Witnesses:
  RICHARD WIRTH,
  MELAINE LEHR.